(12) United States Patent
Kamimura et al.

(10) Patent No.: US 12,091,833 B2
(45) Date of Patent: Sep. 17, 2024

(54) WORK MACHINE

(71) Applicant: KOBELCO CONSTRUCTION MACHINERY CO., LTD., Hiroshima (JP)

(72) Inventors: Yusuke Kamimura, Hiroshima (JP); Yoichiro Yamazaki, Hiroshima (JP); Koji Yamashita, Hiroshima (JP); Daisuke Noda, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 675 days.

(21) Appl. No.: 17/265,269

(22) PCT Filed: Aug. 8, 2019

(86) PCT No.: PCT/JP2019/031503
§ 371 (c)(1),
(2) Date: Feb. 2, 2021

(87) PCT Pub. No.: WO2020/039972
PCT Pub. Date: Feb. 27, 2020

(65) Prior Publication Data
US 2021/0292994 A1    Sep. 23, 2021

(30) Foreign Application Priority Data
Aug. 23, 2018   (JP) .................................. 2018-156005

(51) Int. Cl.
*E02F 3/96*   (2006.01)
*E02F 3/32*   (2006.01)
(Continued)

(52) U.S. Cl.
CPC ................ *E02F 3/435* (2013.01); *E02F 3/32* (2013.01); *E02F 3/7618* (2013.01); *E02F 3/961* (2013.01); *E02F 9/123* (2013.01)

(58) Field of Classification Search
CPC . E02F 3/435; E02F 3/32; E02F 3/7618; E02F 3/961; E02F 9/123; E02F 3/847; E02F 3/964; E02F 9/265; G01C 15/006
See application file for complete search history.

(56) References Cited

U.S. PATENT DOCUMENTS 5,174,385 A    12/1992 Shinbo et al.
5,713,144 A    2/1998  Haraoka
(Continued)

FOREIGN PATENT DOCUMENTS

CN    1157020 A      8/1997
CN    103339327 A    10/2013
(Continued)

OTHER PUBLICATIONS

International Search Report issued on Nov. 5, 2019 in PCT/JP2019/031503 filed on Aug. 8, 2019, 2 pages.
(Continued)

*Primary Examiner* — Russell Frejd
*Assistant Examiner* — Chanmin Park
(74) *Attorney, Agent, or Firm* — Oblon, McClelland, Maier & Neustadt, L.L.P.

(57) ABSTRACT

A work machine includes: a first posture detection device which detects a posture of an upper slewing body with respect to a lower travelling body; a second posture detection device which detects a posture of a blade; a laser beam receiver which is provided to the upper slewing body and can receive a laser beam emitted from a laser beam emitter; and a calculation unit which calculates a height position of a cutting edge of the blade with respect to a surface to be
(Continued)

constructed. The calculation unit calculates the height position of the cutting edge of the blade with respect to the surface to be constructed based on a laser beam receiving position where the laser beam is received by the laser beam receiver, a posture of the upper slewing body with respect to the lower travelling body, and a posture of the blade.

10 Claims, 7 Drawing Sheets

(51) Int. Cl.
  *E02F 3/43* (2006.01)
  *E02F 3/76* (2006.01)
  *E02F 9/12* (2006.01)

(56) References Cited

U.S. PATENT DOCUMENTS

| | | |
|---|---|---|
| 6,171,018 B1 | 1/2001 | Ohtomo et al. |
| 2009/0044434 A1 | 2/2009 | Breuer et al. |
| 2012/0130599 A1 | 5/2012 | Faivre et al. |
| 2014/0100744 A1 | 4/2014 | Johnson et al. |
| 2016/0281334 A1 | 9/2016 | Iwamura et al. |
| 2017/0342678 A1 | 11/2017 | Iwamura et al. |

FOREIGN PATENT DOCUMENTS

| | | |
|---|---|---|
| CN | 103728987 A | 4/2014 |
| CN | 103857854 A | 6/2014 |
| CN | 105121753 A | 12/2015 |
| CN | 106460360 A | 2/2017 |
| EP | 0 288 314 B1 | 1/1991 |
| EP | 0 790 355 A1 | 8/1997 |
| EP | 3 613 905 A1 | 2/2020 |
| JP | 7-207699 A | 8/1995 |
| JP | 7-216930 A | 8/1995 |
| JP | 2000-204580 A | 7/2000 |
| JP | 2001-172972 A | 6/2001 |
| JP | 2017-58272 A | 3/2017 |
| JP | 2017-179949 A | 10/2017 |
| WO | WO 2008/091395 A2 | 7/2008 |

OTHER PUBLICATIONS

Extended European Search Report issued Aug. 26, 2021 in corresponding European Patent Application No. 19851798.9, 7 pages.
Combined Chinese Office Action and Search Report issued Jul. 5, 2022 in Chinese Patent Application No. 201980052263.8 (with unedited computer generated English Translation of Office Action Only), 20 pages.
Combined Chinese Office Action and Search Report issued Dec. 24, 2021 in Chinese Patent Application No. 201980052263.8 (with English Summary and English translation of Categories of Cited Documents), 44 pages.

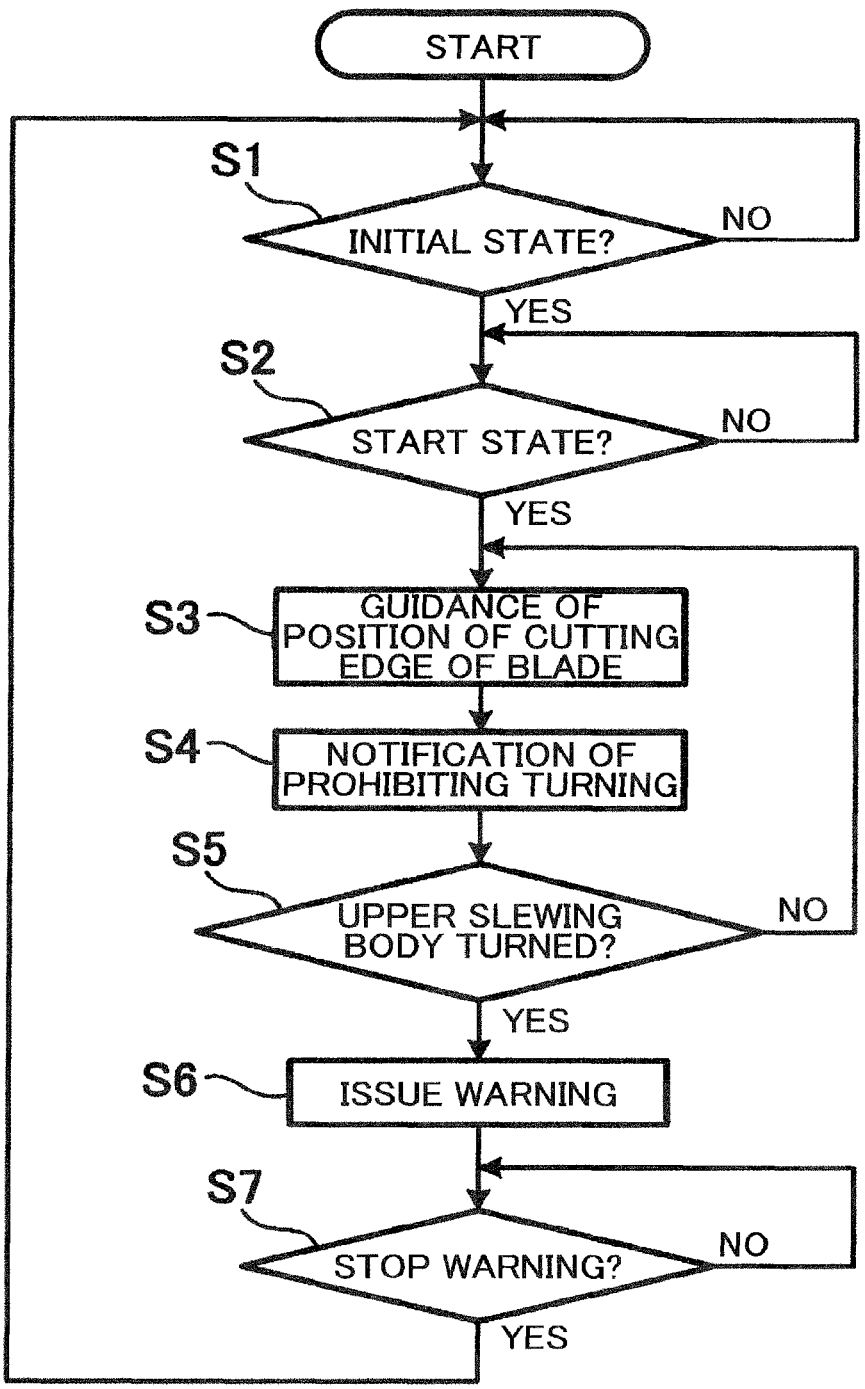

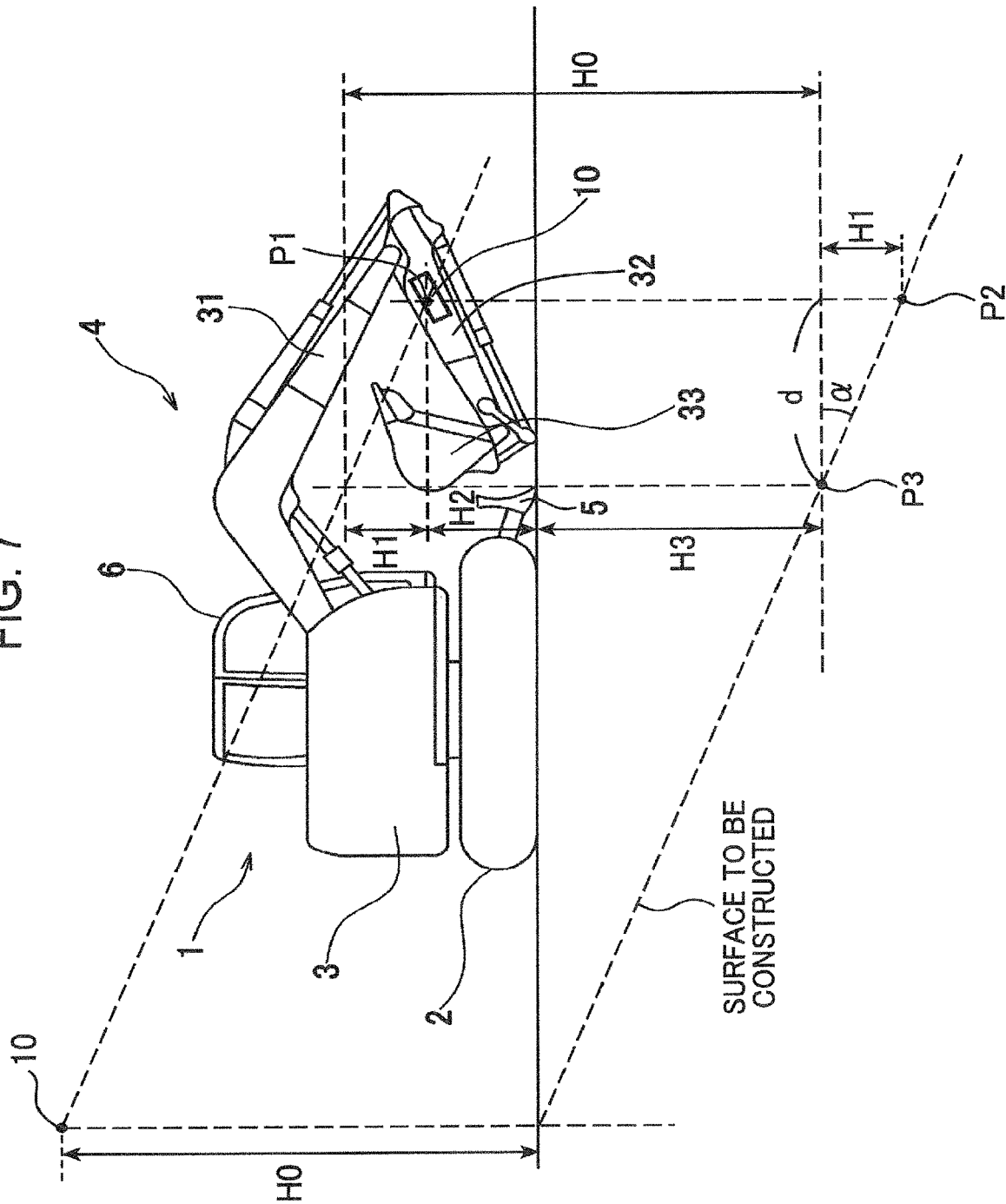

WORK MACHINE

TECHNICAL FIELD

The present invention relates to a work machine including a work device and a blade.

BACKGROUND ART

Patent Literature 1 discloses a technique where a bulldozer makes a surface of soil smooth while receiving laser beam emitted from a laser beam emitter by a laser beam receiver. In the technique disclosed in Patent Literature 1, the bulldozer is operated in accordance with a guidance in the form of a laser beam and hence, the accuracy of a finished ground is improved. The laser beam receiver is mounted on a blade of the bulldozer via a support rod.

A work machine such as a hydraulic excavator includes a blade, and performs an operation of scraping a ground using the blade. Therefore, also in the work machine, it is conceivable to scrape a ground with a blade while receiving a laser beam emitted from a laser beam emitter by a laser beam receiver.

However, in the case of the work machine, a work device is disposed above the blade. Accordingly, if the laser beam receiver is mounted on the blade by way of a support rod, there is a concern that the work device is brought into contact with the laser beam receiver so that the laser beam receiver is broken. In order to avoid such a situation, a mounting position of the laser beam receiver mounted on the blade is lowered. In this case, however, there is a concern that the laser beam receiver becomes smeared with soil and sand so that the laser beam receiver cannot receive the laser beam, or the laser beam receiver is broken by the soil and sand. Further, when the mounting position of the laser beam receiver is lowered, there is a concern that a laser beam is easily blocked by a blocking object such as materials on site.

CITATION LIST

Patent Literature

Patent Literature 1: JP 2001-172972 A

SUMMARY OF INVENTION

It is an object of the present invention to provide a work machine capable of suitably performing an operation of scraping a ground while suitably receiving a laser beam emitted from a laser beam emitter by a laser beam receiver.

A work machine according to an aspect of the present invention includes: a lower travelling body; an upper slewing body rotatably provided to an upper portion of the lower travelling body; a blade mounted on the lower travelling body in a rotatable manner in a vertical direction; a first posture detection device which detects a posture of the upper slewing body with respect to the lower travelling body; a second posture detection device which detects a posture of the blade; a laser beam receiver provided to the upper slewing body and capable of receiving laser beam emitted from a laser beam emitter; and a calculation unit which calculates a height position of a cutting edge of the blade with respect to a surface to be constructed, wherein an inclination direction of the laser beam is parallel to an inclination direction of the surface to be constructed, and the calculation unit calculates a height position of the cutting edge of the blade with respect to the surface to be constructed based on a laser beam receiving position where the laser beam is received by the laser beam receiver, a posture of the upper slewing body with respect to the lower travelling body, and a posture of the blade.

BRIEF DESCRIPTION OF DRAWINGS

FIG. 6 is a flowchart of an operation control.
FIG. 7 is a view showing an example of calculation of a height of a cutting edge of a blade with respect to a surface to be constructed.

DESCRIPTION OF EMBODIMENTS

Hereinafter, preferred embodiments of the present invention are described with reference to drawings.

First Embodiment (Structure of Work Machine)

Figure 1:
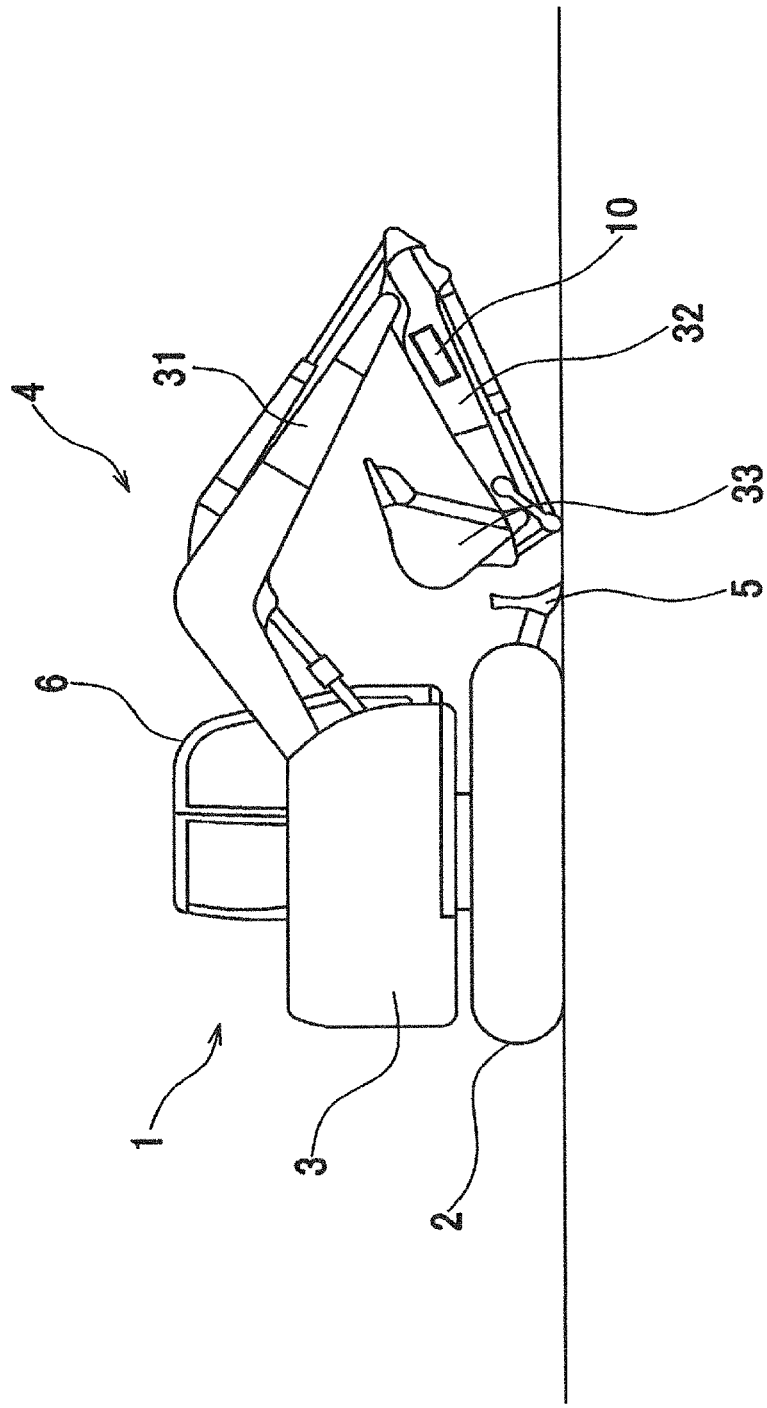
FIG. 1 is a side view of a work machine.

A work machine according to a first embodiment of the present invention is a hydraulic excavator, for example. FIG. 1 is a side view of a work machine 1. As shown in FIG. 1, the work machine 1 includes a lower travelling body 2, an upper slewing body 3, and a blade 5.

The lower travelling body 2 enables travelling of the work machine 1. The upper slewing body 3 is provided to an upper portion of the lower travelling body 2 in a rotatable manner via a slowing device. The upper slewing body 3 has a work device 4 which is rotatable in a vertical direction. A cab (operation room) 6 is provided to a front portion of the upper slewing body 3.

The work device 4 includes a boom 31, an arm 32, and a bucket 33. The boom 31 is mounted on the upper slewing body 3 in a rotatable manner in the vertical direction. The arm 32 is mounted on the boom 31 in a rotatable manner in the vertical direction. The bucket 33 is mounted on the arm 32 in a rotatable manner in the vertical direction.

The blade 5 is mounted on the lower travelling body 2 in a rotatable manner in the vertical direction. The blade 5 pushes out soil and sand in an advancing direction of the work machine 1 and scrapes the ground. A posture of the blade 5 is changed by a posture changing device 15 (see FIG. 2) which is an actuator. Specifically, the blade 5 is moved upward and downward and an inclination of the blade 5 is changed by the posture changing device 15.

Figure 2:
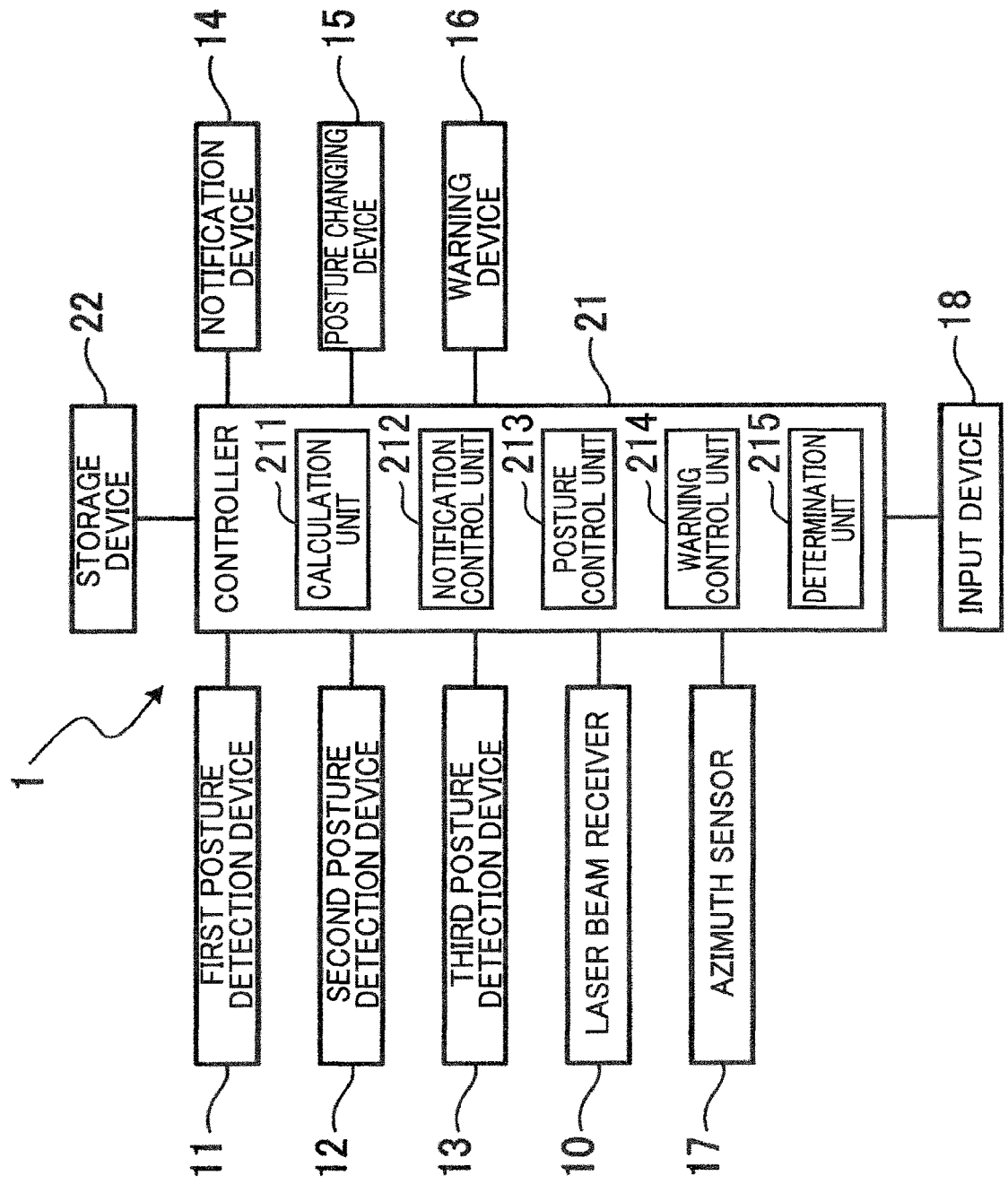
FIG. 2 is a circuit diagram of the work machine.

FIG. 2 is a circuit diagram of the work machine 1. As shown in FIG. 2, the work machine 1 includes a first posture detection device 11, a second posture detection device 12, and a third posture detection device 13.

The first posture detection device 11 detects a posture of the upper slewing body 3 with respect to the lower travelling body 2. In the present embodiment, the first posture detection device 11 detects whether or not the upper slewing body 3 faces a front surface with respect to a front surface of the lower travelling body 2.

The third posture detection device 13 detects a posture of the work device 4. Specifically, the third posture detection device 13 has a boom angle detection sensor, and an arm angle detection sensor. The boom angle detection sensor is provided to the boom 31 and detects an angle of the boom 31 with respect to the upper slewing body 3. The arm angle detection sensor is provided to the arm 32 and detects an angle of the arm 32 with respect to the boom 31.

The second posture detection device 12 detects a posture of the blade 5. Specifically, the second posture detection device 12 detects a height position of the blade 5 and an inclination angle of the blade 5.

The work machine 1 has a laser beam receiver 10. The laser beam receiver 10 can receive a laser beam emitted from a laser beam emitter 50 (see FIG. 3). In the present embodiment, the laser beam receiver 10 is provided to one side surface of the arm 32 in such a manner that the laser beam receiver 10 extends in a longitudinal direction of the arm 32 (see FIG. 1). The laser beam receiver 10 may be provided to each of both side surfaces of the arm 32. The laser beam receiver 10 may be provided to the upper slewing body 3 which is a part other than the work device 4, or may be provided to a portion of the work device 4 other than the arm 32.

In the present embodiment, the laser beam receiver 10 has a longitudinally-elongated rectangular shape, and can receive a laser beam at any position in a longitudinal direction of the laser beam receiver 10.

Further, the work machine 1 has a controller 21 and a storage device 22 as shown in FIG. 2. The controller 21 includes a calculation unit 211, a notification control unit 212, a posture control unit 213, a warning control unit 214, and a determination unit 215.

Figure 3:
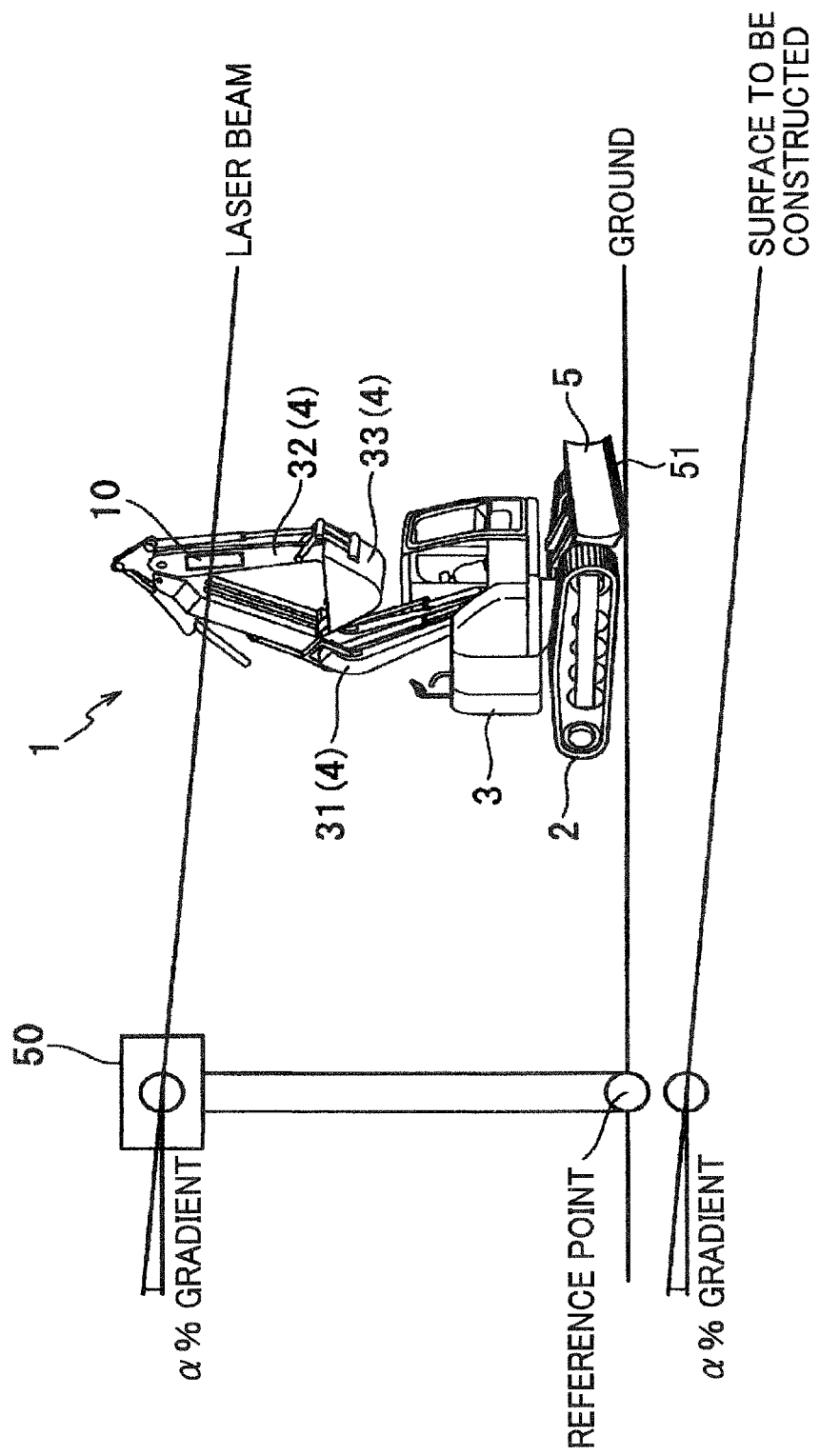
FIG. 3 is a view showing an operation state of the work machine.

The calculation unit 211 calculates a height position of a cutting edge of the blade 5 with respect to a surface to be constructed described later. In this embodiment, the cutting edge of the blade 5 is a lower end 51 of the blade 5 as shown in FIG. 3. Depending on a shape of the ground or a posture of the work machine 1 with respect to the surface to be constructed, the lower end 51 of the blade 5 may be inclined with respect to the surface to be constructed. In this case, a height of the cutting edge of the blade 5 with respect to the surface to be constructed differs corresponding to a position on the lower end 51. In view of the above, the calculation unit 211 may calculate, for example, a height of a predetermined position of the lower end 51 of the blade 5 with respect to the surface to be constructed as a height of the cutting edge of the blade 5. As the predetermined position of the lower end 51 of the blade 5, for example, a center position of the lower end 51 of the blade 5, a left end of the lower end 51, a right end of the lower end 51 or the like can be considered.

The storage device 22 stores information on sizes of the work machine 1. Specifically, the storage device 22 stores at least information on mechanical sizes of the lower travelling body 2, mechanical sizes of the upper slewing body 3, sizes of the boom 31, sizes of the arm 32, sizes of the blade 5, a height of the boom 31 from a proximal end portion to a ground surface of the boom 31, and a position at which the laser beam receiver 10 is mounted on the arm 32.

FIG. 3 is a view showing an operation state of the work machine 1. As shown in FIG. 3, the work machine 1 performs an operation of scraping the ground using the blade 5. At this time, since the work machine 1 performs the operation while receiving a laser beam emitted from the laser beam emitter 50 by the laser beam receiver 10, the accuracy of a finished surface of the ground is improved.

The laser beam emitter 50 is installed upright on the ground and emits laser beam in all directions of 360 degrees. The laser beam emitted from the laser beam emitter 50 has a gradient of a % with respect to the ground. This gradient is as same as a gradient of a target surface to be constructed. Assuming that a position on the ground where the laser beam emitter 50 is installed is a reference point, a depth position of the surface to be constructed at the reference point is a position which is lower than a height of the laser emitting portion of the laser beam emitter 50 by a predetermined length. Therefore, at any position of the laser beam emitted from the laser beam emitter 50, a surface to be constructed is located at a position lower than the height of the position by a predetermined length.

The surface to be constructed is a target surface for excavation. In the present embodiment, the surface to be constructed is a plane which is inclined with a gradient of a %. Therefore, the laser beam emitter 50 emits a laser beam in all directions of 360 degrees on a plane parallel to the surface to be constructed.

As shown in FIG. 3, the work machine 1 receives the laser beam by the laser beam receiver 10 provided to the arm 32. In this manner, in the work machine 1, the laser beam receiver 10 is disposed at a high position. Accordingly, a possibility that a laser beam is blocked by soil and sand or a blocking object is lowered as compared with a case where a laser beam receiver 10 is disposed at the same height position as the lower travelling body 2 or the blade 5.

The calculation unit 211 (see FIG. 2) calculates a height position of the cutting edge of the blade 5 with respect to the surface to be constructed based on a laser beam receiving position where the laser beam is received by the laser beam receiver 10, a posture of the upper slewing body 3 with respect to the lower travelling body 2, a posture of the work device 4, and a posture of the blade 5. In the present embodiment, the posture of the upper slewing body 3 with respect to the lower travelling body 2 is a posture that the upper slewing body 3 faces a front surface with respect to a front surface of the lower travelling body 2.

The height position of the cutting edge of the blade 5 with respect to the laser beam receiving position where the laser beam is received can be calculated by using the information on the sizes of the work machine 1 which the storage device 22 (see FIG. 2) stores, the laser beam receiving position where the laser beam is received by the laser beam receiver 10, the posture of the upper slewing body 3 with respect to the lower travelling body 2, the posture of the work device 4, and the posture of the blade 5. Further, at any position of the laser beam emitted from the laser beam emitter 50, the surface to be constructed is located at a position lower than the height of the position by a predetermined length. Accordingly, the height position of the surface to be constructed with respect to the laser beam receiving position where the laser beam is received is known. Therefore, if the height position of the blade 5 with respect to the laser beam receiving position where a laser beam is received is obtained, a height position of the cutting edge of the blade 5 with respect to the surface to be constructed is calculated. Accordingly, the work machine 1 can change the posture of the blade 5 so as to make the blade 5 scrape the ground to the height of the surface to be constructed. Therefore, the work machine 1 can suitably perform an operation of scraping the ground while suitably receiving a laser beam emitted from the laser beam emitter 50 by the laser beam receiver 10.

FIG. 7 is a view showing an example of calculating a height of the cutting edge of the blade 5 with respect to the surface to be constructed. Symbol d indicates a distance in the longitudinal direction between a laser beam receiving position P1 where the laser beam is received and the cutting edge of the blade 5. Hereinafter, the height direction indicates a vertical direction on a paper surface, and the longitudinal direction indicates a transverse direction on the paper surface.

The distance d is calculated based on a posture of the blade 5, a posture of the upper slewing body 3 with respect to the lower travelling body 2, a posture of the work device 4, and a laser beam receiving position P1.

H0 indicates a distance between the laser beam emitter 50 and the surface to be constructed in the height direction and is known.

H1 indicates a distance in the height direction between a position P2 on the surface to be constructed directly below the laser beam receiving position P1, and a position P3 on the surface to be constructed directly below the cutting edge of the blade 5. In a case where the laser beam receiving position P1 is displaced in the longitudinal direction with respect to the cutting edge of the blade 5, it is necessary to take into account the distance H1 in calculating a distance H3. The distance H1 is expressed by an equation H1=d·tan α. Symbol a indicates a gradient of the surface to be constructed.

H2 indicates a distance in the height direction between the laser beam receiving position P1 where a laser beam is received and the cutting edge of the blade 5. The distance H2 is calculated based on a posture of the blade 5, a posture of the upper slewing body 3 with respect to the lower travelling body 2, a posture of the work device 4, and the laser beam receiving position P1.

H3 indicates a distance in the height direction between the surface to be constructed and the cutting edge of the blade 5. The distance H3 is calculated by an equation of H0−(H1+H2). What is necessary to obtain is the distance H3. Therefore, the calculation unit 211 obtains the distance H3 by calculating the distance H1 and the distance H2, and by putting the distance H1 and the distance H2 into the above equation.

Further, as shown in FIG. 2, the work machine 1 has a notification device 14 (an example of a first notification device and a second notification device). The notification device 14 can notify an operator in the cab 6 of information. In the present embodiment, the notification device 14 is a display and/or a speaker disposed in the cab 6. A notification control unit 212 (an example of the first notification control unit and the second notification control unit) causes the notification device 14 to notify the operator of the height position of the cutting edge of the blade 5 with respect to the surface to be constructed calculated by the notification control unit 212. Specifically, the notification control unit 212 causes the display to display information such as how many centimeters the cutting edge of the blade 5 is away from the surface to be constructed, or causes the speaker to output such information by voice. As a result, the operator can change the posture of the blade 5 so as to make the blade 5 scrape the ground to the height of the surface to be constructed in accordance with the content of the notification.

The posture control unit 213 may control the above-mentioned posture changing device 15 as follows. The blade 5 scrapes the ground to the height of the surface to be constructed based on the height position of the cutting edge of the blade 5 with respect to the surface to be constructed calculated by the calculation unit 211. As a result, the work machine 1 can automatically change the posture of the blade 5 so as to make the blade 5 scrape the ground to the height of the surface to be constructed. For example, it is sufficient for the posture control unit 213 to control the posture of the blade 5 such that the cutting edge of the blade 5 moves along the surface to be constructed.

As shown in FIG. 3, the laser beam receiver 10 is mounted on the work device 4. Therefore, when the laser beam receiver 10 which has been receiving the laser beam has stopped receiving of the laser beam, the laser beam receiver 10 can easily receive the laser beam again by moving the work device 4.

The laser beam receiver 10 is mounted on the arm 32 in an extending manner in the longitudinal direction of the arm 32. Usually, the work machine 1 can bring the arm 32 into a vertically extending posture. The laser beam receiver 10 is mounted on the arm 32 such that the longitudinal direction of the laser beam receiver 10 conforms with the longitudinal direction of the arm 32. Accordingly, in the work machine 1, by bringing the arm 32 into a posture where the arm 32 extends vertically, the laser beam receiver 10 can be arranged in a vertically elongated manner. As a result, in the work machine 1, a laser beam can be suitably received by the laser beam receiver 10 in a wide range in the vertical direction.

(State Before Operation)

As described above, the work machine 1 can calculate the height position of the cutting edge of the blade 5 with respect to the surface to be constructed. However, it is not possible to determine that which direction the work machine 1 is facing with respect to an inclination direction of the surface to be constructed. Accordingly, it is necessary to clarify which direction the work machine 1 is facing with respect to an inclination direction of the surface to be constructed before performing the operation in accordance with the guidance by the laser beam.

Figure 4:
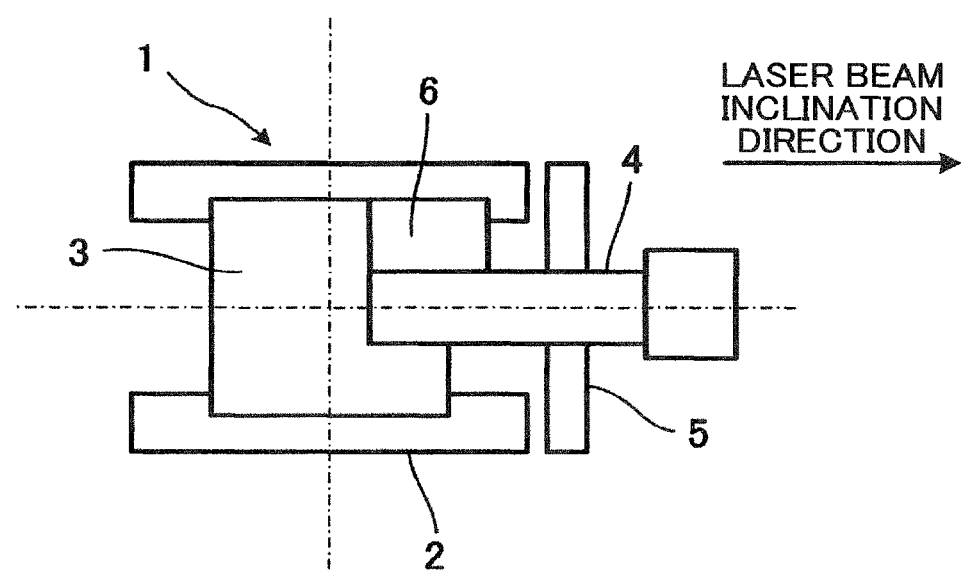
FIG. 4 is a view of the work machine as viewed from above.

In the present embodiment, the posture control unit 213 brings the work machine 1 into an initial state before performing the operation by moving the lower travelling body 2 and the upper slewing body 3. FIG. 4 is a view of the work machine 1 as viewed from above. As shown in FIG. 4, the initial state is a state where an angle of the upper slewing body 3 with respect to the lower travelling body 2 is a specific angle, and the direction of the upper slewing body 3 with respect to an inclination direction of the laser beam (an inclination direction of the surface to be constructed) is a specific direction. In this manner, the operation is started after clarifying which direction the work machine 1 is facing with respect to an inclination direction of the laser beam.

In the present embodiment, in the initial state, the upper slewing body 3 faces the front surface with respect to the front surface of the lower travelling body 2, and the direction of the upper slewing body 3 is parallel to an inclination direction of the laser beam. If the initial state is such a state, the posture control unit 213 can easily bring the work machine 1 into the initial state by making the front surface of the lower travelling body 2 and the front surface of the upper slewing body 3 align with each other, and by making the direction of the upper slewing body 3 parallel to an inclination direction of the laser beam.

Figure 5:
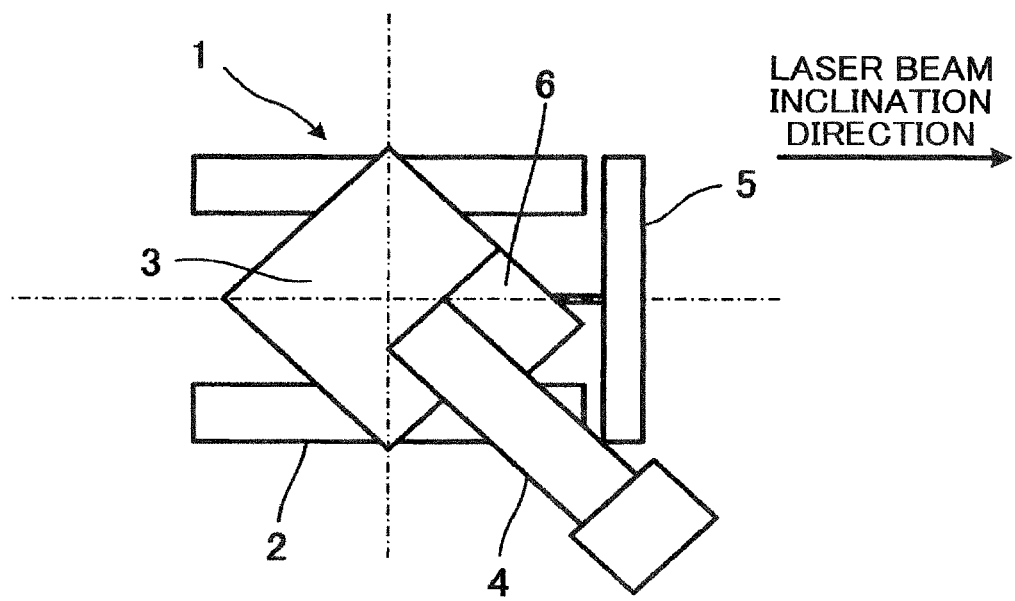
FIG. 5 is a view of the work machine as viewed from above.

In the present embodiment, the posture control unit 213 may bring the work machine 1 into an operation start state by further turning the upper slewing body 3 from the initial state before performing the operation. FIG. 5 is a view of the work machine 1 as viewed from above. As shown in FIG. 5, the start state is a state where the upper slewing body 3 is further turned by a predetermined angle from the initial state. The predetermined angle is 45 degrees, for example. By further turning the upper slewing body 3 from the initial state, the operator in the cab 6 can more easily visually recognize the blade 5. In this manner, the work machine 1 may start the operation after the blade 5 is brought into a posture that the blade 5 is easily visually recognized from the operator in the cab 6.

After the operation is started, the lower travelling body 2 may travel in any direction.

Further, when the upper slewing body 3 turns during operation, the posture of the upper slewing body 3 with respect to the lower travelling body 2 changes. Accordingly, the calculation unit 211 cannot accurately calculate the height position of the cutting edge of the blade 5 with respect to the surface to be constructed. This is because, the first posture detection device 11 (see FIG. 2) is constituted of a sensor capable of detecting whether or not the upper slewing body 3 is facing the front surface with respect to the front surface of the lower travelling body 2, and a relative angle of the upper slewing body 3 with respect to the lower travelling body 2 cannot be detected. Although the turning of the upper slewing body 3 can be detected by the gyro sensor, the gyro sensor cannot grasp which direction the lower travelling body 2 is facing with respect to the upper slewing body 3. This is because the gyro sensor detects the turning motion of the work machine 1 by the lower travelling body 2 in the same manner as the turning motion of the upper slewing body 3. Accordingly, the gyro sensor cannot distinguish whether the lower travelling body 2 is facing a direction different from the direction of the upper slewing body 3 or is facing the same direction as the upper slewing body 3. This also applies to an angle sensor which detects a turning angle of the upper slewing body 3 based on a change between a pitching angle and a rolling angle of the upper slewing body 3.

Accordingly, as shown in FIG. 2, the notification control unit 212 causes the notification device 14 to perform notification for prohibiting turning of the upper slewing body 3 after the operation is started in the initial state or the start state. In the present embodiment, the notification device 14 is a display and/or a speaker disposed in the cab 6. Specifically, the notification control unit 212 causes the display to display a wording to the effect that turning of the upper slewing body 3 is prohibited on, or causes the speaker to output such a wording by voice. With such a configuration, it is possible to prevent the operator from erroneously turning the upper slewing body 3.

As shown in FIG. 2, the work machine 1 has a warning device 16. The warning device 16 can issue a warning to an operator. In the present embodiment, the warning device 16 is a display and/or a speaker disposed in the cab 6. The warning control unit 214, after the operation is started, causes the warning device 16 to issue a warning when the upper slewing body 3 is turned.

Specifically, the warning control unit 214 causes the display to display a wording to the effect that an operation cannot be performed accurately, or causes the speaker to output such a wording by voice. With such a configuration, it is possible to prevent an operator from erroneously continuing the operation.

After the operation is started, the posture control unit 213 may prohibit turning of the upper slewing body 3. For example, it is sufficient for the posture control unit 213 to execute a control such as invalidating an operation of commanding turning of the upper slewing body 3 or applying braking to the turning operation.

In the present invention, it is troublesome for an operator to manually bring the state of the work machine 1 to the initial state. In view of the above circumstance, as shown in FIG. 2, the work machine 1 has an azimuth sensor 17 and an input device 18. The azimuth sensor 17 detects an azimuth of the front surface of the lower travelling body 2, and an azimuth of the front surface of the upper slewing body 3. The input device 18 is, for example, a touch panel, and inputs inclination information indicating an inclination direction of the laser beam to the controller 21. The configuration in which the inclination information is manually inputted is an example. For example, the controller 21 may acquire the inclination information by receiving the inclination information transmitted from a transmitter of the laser beam emitter 50 by the input device 18.

The determination unit 215 determines whether or not the work machine 1 is in the initial state based on an inclination direction of a laser beam, an azimuth of the front surface of the lower travelling body 2, and an azimuth of the front surface of the upper slewing body 3. The determination result is displayed on the display or is notified by voice from the speaker. Based on the determination result, the operator can easily bring the work machine 1 into the initial state by moving the lower travelling body 2 and the upper slewing body 3.

(Manner of Operation of Work Machine)

FIG. 6 is a flowchart of an operation control. The manner of operation of the work machine 1 is described with reference to FIG. 6. In this flowchart, the description is made with respect to a case where the operation is started in a start state.

First, the determination unit 215 of the controller 21 determines whether or not the work machine 1 is in an initial state (step S1). The operator brings the work machine 1 into the initial state by moving the work machine 1 in accordance with information displayed on the display and/or output by voice from the speaker. When the determination unit 215 determines in step S1 that the work machine 1 is not in the initial state (S1: NO), the determination unit 215 repeats processing in step S1. On the other hand, when the determination unit 215 determines in step S1 that the work machine 1 is in the initial state (S1: YES), the determination unit 215 determines whether or not the work machine 1 is in the start state (step S2). The operator brings the work machine 1 into the start state by moving the work machine 1. When the work machine 1 is brought into the start state, the operator inputs information indicating that the work machine 1 is in the start state to the touch panel or the like. As a result, the determination unit 215 can determine whether or not the work machine 1 is in the start state.

When the determination unit 215 determines in step S2 that the work machine 1 is not in the start state (S2: NO), the determination unit 215 repeats processing in step S2. On the other hand, when the determination unit 215 determines in step S2 that the work machine 1 is in the start state (S2: YES), the notification control unit 212 performs the guidance of the position of the cutting edge of the blade 5 (step S3). That is, the calculation unit 211 calculates a height position of the cutting edge of the blade 5 with respect to the surface to be constructed using the laser beam receiving position where the laser beam is received by the laser beam receiver 10, the posture of the upper slewing body 3 with respect to the lower travelling body 2, the posture of the work device 4, and the posture of the blade 5. Then, the notification control unit 212 notifies the operator in the cab 6 of information on the calculated height position of the cutting edge of the blade 5 by using the notification device 14.

Next, the notification control unit 212 causes the notification device 14 to perform notification for prohibiting turning of the upper slewing body 3 (step S4). Thereafter, the warning control unit 214 determines whether or not the upper slewing body 3 is turned (step S5). When the warning control unit 214 determines in step S5 that the upper slewing body 3 is not turned (S5: NO), the warning control unit 214 returns processing to step S3. On the other hand, when the warning control unit 214 determines in step S5 that the upper slewing body 3 is turned (S5: YES), the warning control unit 214 causes the warning device 16 to issue the warning (step S6).

Thereafter, the warning control unit 214 determines whether or not the warning is stopped (step S7). The operator can cancel the warning by operating the touch panel or the like. When the warning control unit 214 determines in step S7 that the warning is not stopped (S7: NO), the warning control unit 214 repeats the processing in step S7. On the other hand, when the warning control unit 214 determines in step S7 that the warning is stopped (S7: YES), the warning control unit 214 returns the processing to step S1. In this case, the operator restarts the operation from the operation of bringing the work machine 1 into the initial state.

Advantageous Effects

As described above, according to the work machine 1 of the present embodiment, the laser beam receiver 10 is disposed on the upper slewing body 3. As described above, in the work machine 1, the laser beam receiver 10 is disposed at the position higher than the lower travelling body 2 or the blade 5. Accordingly, in the work machine 1, a possibility that the laser beam is blocked by soil and sand or a blocking object is lowered. Further, the work machine 1 calculates a height position of the cutting edge of the blade 5 with respect to the surface to be constructed based on a laser beam receiving position where the laser beam is received by the laser beam receiver 10, a posture of the upper slewing body 3 with respect to the lower travelling body 2, a posture of the work device 4, and a posture of the blade 5. Accordingly, the operator can recognize the height position of the cutting edge of the blade 5 with respect to the surface to be constructed and hence, the operator can change a posture of the blade 5 so as to make the blade 5 scrape the ground to the height of the surface to be constructed. Therefore, the work machine 1 can suitably perform an operation of scraping the ground while suitably receiving a laser beam emitted from the laser beam emitter 50 by the laser beam receiver 10.

Further, the height position of the cutting edge of the blade 5 with respect to the surface to be constructed is notified. As a result, the operator can change the posture of the blade 5 so as to make the blade 5 scrape the ground to the height of the surface to be constructed in accordance with the content of the notification.

Further, the posture changing device 15 is controlled such that the blade 5 scrapes the ground to the height of the surface to be constructed based on the height position of the cutting edge of the blade 5 with respect to the surface to be constructed. As a result, the work machine 1 can automatically change the posture of the blade 5 so as to make the blade 5 scrape the ground to the height of the surface to be constructed.

Further, the laser beam receiver 10 is mounted on the work device 4. Accordingly, when the laser beam receiver 10 which receives the laser beam no longer receives the laser beam, the work machine 1 can easily receive the laser beam again by the laser beam receiver 10 by moving the work device 4.

The laser beam receiver 10 is mounted on the arm 32 in an extending manner in the longitudinal direction of the arm 32. Usually, the work machine 1 can bring the arm 32 into a vertically extending posture. Accordingly, if the arm 32 is brought into the vertically extending posture, the work machine 1 can arrange the laser beam receiver 10 in a vertically elongated manner. As a result, the work machine 1 can suitably receive the laser beam by the laser beam receiver 10 in a wide range in the vertical direction.

Further, after the operation is started in the initial state where an angle of the upper slewing body 3 with respect to the lower travelling body 2 is a specific angle and the direction of the upper slewing body 3 with respect to an inclination direction of the laser beam is a specific direction, the notification of prohibiting turning of the upper slewing body 3 is performed. When the upper slewing body 3 turns after the operation is started, a posture of the upper slewing body 3 with respect to the lower travelling body 2 changes. Therefore, the calculation unit 211 cannot accurately calculate the height position of the cutting edge of the blade 5 with respect to the surface to be constructed. Accordingly, after the work machine 1 starts the operation in the initial state, the work machine 1 performs the notification of prohibiting turning of the upper slewing body 3. As a result, the work machine 1 can suppress the occurrence of a phenomenon that the operator erroneously turns the upper slewing body 3.

Further, after the operation is started in the start state where the upper slewing body 3 is further turned by a predetermined angle from the initial state, a notification of prohibiting turning of the upper slewing body 3 is performed. When the upper slewing body 3 turns after the operation is started, a posture of the upper slewing body 3 with respect to the lower travelling body 2 changes. In this case, the calculation unit 211 cannot accurately calculate the height position of the cutting edge of the blade 5 with respect to the surface to be constructed. Therefore, after the operation is started in the start state, the work machine 1 performs the notification of prohibiting turning of the upper slewing body 3. As a result, it is possible to suppress the occurrence of a phenomenon that the operator erroneously turns the upper slewing body 3.

In addition, a warning is issued in a case where the upper slewing body 3 is turned after the operation is started. When the upper slewing body 3 turns after the operation is started, the calculation unit 211 cannot accurately calculate the height position of the cutting edge of the blade 5 with respect to the surface to be constructed. As a result, the work machine 1 cannot perform an operation accurately. Therefore, the work machine 1 issues a warning in such a case. As a result, it is possible to suppress the occurrence of a phenomenon that the operation is erroneously continued by the operator.

Further, the initial state is a state where the upper slewing body 3 faces the front surface with respect to the front surface of the lower travelling body 2, and the direction of the upper slewing body 3 is parallel to an inclination direction of the laser beam. Accordingly, the operator can easily bring the work machine 1 into the initial state by aligning an azimuth of the front surface of the lower travelling body 2 and an azimuth of the front surface of the upper slewing body 3 with each other and by making the azimuth of the upper slowing body 3 parallel to an inclination direction of the laser beam.

Further, it is determined whether or not the work machine 1 is in the initial state based on the inclination direction of a laser beam, the azimuth of the front surface of the lower travelling body 2, and the azimuth of the front surface of the upper slewing body 3. Accordingly, the operator can easily bring the work machine 1 into the initial state by moving the lower travelling body 2 and/or the upper slewing body 3 based on the determination result.

Second Embodiment

Next, a work machine 1 of a second embodiment will be described with reference to the drawings. The description with respect to a configuration common to the first embodiment and advantageous effects obtained by the configuration is omitted, and a point which makes the second embodiment different from the first embodiment is described. The same symbols as those in the first embodiment are given to the same members of this embodiment as those in the first embodiment.

(Structure of Work Machine)

In the first embodiment, the first posture detection device 11 shown in FIG. 2 detects whether or not the upper slewing body 3 faces the front surface with respect to the front surface of the lower travelling body 2. Accordingly, in the work machine 1 of the first embodiment, when the upper slewing body 3 turns during operation, the height position of the cutting edge of the blade 5 with respect to the surface to be constructed cannot be accurately calculated.

Therefore, the work machine 1 of the second embodiment adopts a relative angle detection device as the first posture detection device 11. The relative angle detection device detects a relative angle of the upper slewing body 3 with respect to the lower travelling body 2. The relative angle detection device is a resolver, an encoder, or the like, for example.

With the use of the relative angle of the upper slewing body 3 with respect to the lower travelling body 2, the calculation unit 211 can accurately calculate the height position of the cutting edge of the blade 5 with respect to the surface to be constructed even when the upper slewing body 3 turns after the operation is started. Accordingly, the operator can freely turn the upper slewing body 3 after the operation is started. As a result, the second embodiment can enhance the degree of freedom in operation. Further, in the work machine 1 of the second embodiment, it is possible to turn the upper slewing body 3 such that the laser beam receiver 10 receives the laser beam and hence, the operation efficiency can be further enhanced.

When the first posture detection device 11 is constituted of the relative angle detection device, with respect to the azimuth of the front surface of the lower travelling body 2 and the azimuth of the front surface of the upper slewing body 3, the azimuth of the other front surface can be determined from the azimuth of one front surface. Accordingly, the azimuth sensor 17 of the present embodiment may be a sensor which detects either one of the azimuth of the front surface of the lower travelling body 2 or the azimuth of the front surface of the upper slewing body 3.

In the present embodiment, the operation is started after bringing the work machine 1 into the initial state. Even when the upper slewing body 3 is turned after the operation is started, the calculation unit 211 can continue the calculation of the height position of the cutting edge of the blade 5 with respect to the surface to be constructed and hence, the guidance of the position of the cutting edge of the blade 5 can be performed suitably.

Advantageous Effects

As described above, according to the work machine 1 according to the second embodiment, when the upper slewing body 3 turns after the operation is started in the initial state, the height position of the cutting edge of the blade 5 with respect to the surface to be constructed is calculated based on the relative angle detected by the relative angle detection device. By using the relative angle of the upper slewing body 3 with respect to the lower travelling body 2, even when the upper slewing body 3 turns after the operation is started, the calculation unit 211 can calculate the height position of the cutting edge of the blade 5 with respect to the surface to be constructed. Accordingly, the upper slewing body 3 can be freely turned after the operation is started and hence, the degree of freedom in operation is enhanced, and the operation efficiency is enhanced by turning the upper slewing body 3 such that the laser beam receiver 10 receives the laser beam.

Although the embodiments of the present invention have been described above, only specific examples are exemplified, and the present invention is not particularly limited, and specific configurations and the like can be appropriately redesigned. Further, the manner of operations and advantageous effects described in the embodiments of the invention are merely the most suitable manner of operations and advantageous effects obtained by the present invention, and the manner of operations and advantageous effects obtained by the present invention are not limited to the manner of operations and advantageous effects described in the embodiments of the present invention.

SUMMARY OF THE PRESENT EMBODIMENT

The work machine according to one aspect of the present invention includes: a lower travelling body; an upper slewing body rotatably provided to an upper portion of the lower travelling body; a blade mounted on the lower travelling body in a rotatable manner in a vertical direction; a first posture detection device which detects a posture of the upper slewing body with respect to the lower travelling body; a second posture detection device which detects a posture of the blade; a laser beam receiver provided to the upper slewing body and capable of receiving laser beam emitted from a laser beam emitter; and a calculation unit which calculates a height position of a cutting edge of the blade with respect to a surface to be constructed, wherein an inclination direction of the laser beam is parallel to an inclination direction of the surface to be constructed, and the calculation unit calculates a height position of the cutting edge of the blade with respect to the surface to be constructed based on a laser beam receiving position where the laser beam is received by the laser beam receiver, a posture of the upper slewing body with respect to the lower travelling body, and a posture of the blade.

According to the above-mentioned configuration, the laser beam receiver is provided to the upper slewing body. As described above, the work machine is provided with the laser beam receiver at a position higher than the lower travelling body or the blade. Accordingly, in the work machine, a possibility that a laser beam is blocked by soil and sand or a blocking object is lowered. Further, in the work machine, a height position of the cutting edge of the blade with respect to the surface to be constructed is calculated based on the laser beam receiving position where the laser beam is received by the laser beam receiver, the posture of the upper slewing body with respect to the lower travelling body, and the posture of the blade. As a result, an operator can recognize the height position of the cutting edge of the blade with respect to the surface to be constructed and hence, the posture of the blade can be changed so as to make the blade scrape the ground to the height of the surface to be constructed. Therefore, the work machine can suitably perform the operation of scraping a ground while suitably receiving a laser beam emitted from the laser beam emitter by the laser beam receiver.

In the above-mentioned configuration, the work machine may further include a first notification device capable of notifying an operator of information, and a first notification control unit which causes the first notification device to notify the operator of the height position of the cutting edge of the blade with respect to the surface to be constructed calculated by the calculation unit.

According to the above-mentioned configuration, the height position of the cutting edge of the blade with respect to the surface to be constructed is notified to the operator. As a result, the operator can change the posture of the blade so as to make the blade scrape the ground to the height of the surface to be constructed in accordance with the content of the notification.

With such a configuration, the work machine may further include a posture changing device which changes a posture of the blade, and a posture control unit which controls the posture changing device such that the blade scrapes the ground to the height of the surface to be constructed based on the height position of the cutting edge of the blade with respect to the surface to be constructed calculated by the calculation unit.

With such a configuration, the posture changing device is controlled such that the blade scrapes the ground to the height of the surface to be constructed based on the height position of the cutting edge of the blade with respect to the surface to be constructed. As a result, the work machine can automatically change the posture of the blade so as to make the blade scrape the ground to the height of the surface to be constructed.

In the above-mentioned configuration, the upper slewing body may include a work device capable of rotating in the vertical direction, the work machine may further include a third posture detection device which detects a posture of the work device, the laser beam receiver may be mounted on the work device, and the calculation unit may calculate the height position of the cutting edge of the blade with respect to the surface to be constructed based on a laser beam receiving position where the laser beam is received by the laser beam receiver, a posture of the upper slewing body with respect to the lower travelling body, a posture of the work device, and a posture of the blade.

According to such a configuration, the laser beam receiver is mounted on the work device. Accordingly, when the laser beam receiver which has been receiving the laser beam has stopped receiving of the laser beam, the work machine can easily receive the laser beam again by the laser beam receiver by moving the work device.

Further, in the above-mentioned configuration, the work device may include a boom mounted on the upper slewing body in a rotatable manner in the vertical direction, and an arm mounted on the boom in a rotatable manner in the vertical direction, and the laser beam receiver may be mounted on the arm so as to extend in a longitudinal direction of the arm.

With such a configuration, the laser beam receiver is mounted on the arm so as to extend in the longitudinal direction of the arm. Usually, the work machine can bring the arm into a vertically extending posture. Accordingly, when the arm is brought into the vertically extending posture, the work device can arrange the laser beam receiver in a vertically elongated manner. As a result, the work machine can suitably receive a laser beam by the laser beam receiver in a wide range in the vertical direction.

In the above-mentioned configuration, the work machine may further include: a second notification device capable of notifying an operator of information; and a second notification control unit which causes the second notification device to perform the notification of prohibiting turning of the upper slewing body after the operation is started in an initial state where an angle of the upper slewing body with respect to the lower travelling body is a specific angle, and a direction of the upper slewing body with respect to an inclination direction of the laser beam is a specific direction.

With such a configuration, the notification of prohibiting turning of the upper slewing body is performed after the operation is started in the initial state where an angle of the upper slewing body with respect to the lower travelling body is a specific angle and the direction of the upper slewing body with respect to an inclination direction of the laser beam is a specific direction. When the upper slewing body turns after the operation is started, the posture of the upper slewing body with respect to the lower travelling body changes. Therefore, the calculation unit cannot accurately calculate the height position of the cutting edge of the blade with respect to the surface to be constructed. Accordingly, the work machine performs the notification of prohibiting turning of the upper slewing body after the work machine starts the operation in the initial state. As a result, the work machine can suppress the occurrence of a phenomenon that an operator erroneously turns the upper slewing body.

In the above-mentioned configuration, the second notification control unit may cause the second notification device to perform the notification of prohibiting turning of the upper slewing body after the operation is started in a start state where the upper slewing body further turns by a predetermined angle from the initial state.

With such a configuration, a notification of prohibiting turning of the upper slewing body is performed after the operation is started in the start state where the upper slewing body further turns by a predetermined angle from the initial state. When the upper slewing body turns after the operation is started, the posture of the upper slewing body with respect to the lower travelling body changes. In this case, the calculation unit cannot accurately calculate the height position of the cutting edge of the blade with respect to the surface to be constructed. Therefore, the work device performs the notification of prohibiting turning of the upper slewing body after the operation is started in the start state. As a result, it is possible to suppress the occurrence of a phenomenon that an operator erroneously turns the upper slewing body.

In the above-mentioned configuration, the work machine may further include a warning device capable of issuing a warning, and a warning control unit which causes the warning device to issue a warning when the upper slewing body is turned after the operation is started.

With such a configuration, a warning is issued when the upper slewing body is turned after the operation is started. When the upper slewing body turns after the operation is started, the calculation unit cannot accurately calculate the height position of the cutting edge of the blade with respect to the surface to be constructed. As a result, the work device cannot perform an operation accurately. Therefore, the work device issues a warning in such a case. As a result, it is possible to suppress the occurrence of a phenomenon that the operation is erroneously continued by the operator.

In the above-mentioned configuration, the first posture detection device may be a relative angle detection device which detects a relative angle of the upper slewing body with respect to the lower travelling body, and the calculation unit may calculate the height position of the cutting edge of the blade with respect to the surface to be constructed based on the relative angle detected by the relative angle detection device in a case where the upper slewing body turns after the operation is started in an initial state where an angle of the upper slewing body with respect to the lower travelling body is a specific angle, and a direction of the upper slewing body with respect to an inclination direction of the laser beam is the specific direction.

According to the above-mentioned configuration, after the operation is started in the initial state, when the upper slewing body turns, the height position of the cutting edge of the blade with respect to the surface to be constructed is calculated based on the relative angle detected by the relative angle detection device. By using the relative angle of the upper slewing body with respect to the lower travelling body, even when the upper slewing body turns after the operation is started, the calculation unit can accurately calculate the height position of the cutting edge of the blade with respect to the surface to be constructed. Accordingly, the upper slewing body can be freely turned after the operation is started and hence, the degree of freedom in operation is enhanced, and the operation efficiency is enhanced by turning the upper slewing body such that the laser beam receiver receives the laser beam.

In the above-mentioned configuration, the initial state may be a state where the upper slewing body faces a front surface with respect to a front surface of the lower travelling body, and a direction of the upper slewing body is parallel to an inclination direction of the laser beam.

With such a configuration, the initial state is a state where the upper slewing body faces the front surface with respect to the front surface of the lower travelling body, and the direction of the upper slewing body is parallel to an inclination direction of the laser beam. Accordingly, an operator can easily bring the work machine into the initial state by aligning an azimuth of the front surface of the lower travelling body and an azimuth of the front surface of the upper slewing body with each other and by making the azimuth of the upper slewing body parallel to an inclination direction of the laser beam.

In the above-mentioned configuration, the work machine may further include: an azimuth sensor which detects at least one of an azimuth of a front surface of the lower travelling body and an azimuth of a front surface of the upper slewing body; and a determination unit which determines whether or not the work machine is in the initial state based on an inclination direction of the laser beam, the azimuth of the front surface of the lower travelling body, and the azimuth of the front surface of the upper slewing body.

With such a configuration, it is determined whether or not the work machine is in the initial state based on an inclination direction of the laser beam, the azimuth of the front surface of the lower travelling body, and the azimuth of the front surface of the upper slewing body. Accordingly, the operator can easily bring the work machine into the initial state by moving the lower travelling body and/or the upper slewing body based on the determination result.

The invention claimed is:

1. A work machine comprising:
a lower travelling body;
an upper slewing body rotatably provided to an upper portion of the lower travelling body;
a blade mounted on the lower travelling body in a rotatable manner in a vertical direction;
a first posture detection device which detects a posture of the upper slewing body with respect to the lower travelling body;
a second posture detection device which detects a posture of the blade;
a laser beam receiver provided to the upper slewing body and capable of receiving laser beam emitted from a laser beam emitter; and
a calculation unit which calculates a height position of a cutting edge of the blade with respect to a surface to be constructed,
wherein
an inclination direction of the laser beam is parallel to an inclination direction of the surface to be constructed,
the calculation unit calculates a height position of the cutting edge of the blade with respect to the surface to be constructed based on a laser beam receiving position where the laser beam is received by the laser beam receiver, a posture of the upper slewing body with respect to the lower travelling body, and a posture of the blade,
the work machine further comprises:
a first notification device capable of notifying an operator of information; and
a first notification control unit which causes the first notification device to perform a notification of prohibiting turning of the upper slewing body after the operation is started in an initial state where an angle of the upper slewing body with respect to the lower travelling body is a specific angle, and a direction of the upper slewing body with respect to the inclination direction of the laser beam is a specific direction, and
the notification is performed by causing a display to display a wording indicating that the turning of the upper slewing body is prohibited.

2. The work machine according to claim 1, further comprising:
a second notification device capable of notifying the operator of information; and
a second control unit which causes the second notification device to notify the operator of the height position of the cutting edge of the blade with respect to the surface to be constructed calculated by the calculation unit.

3. The work machine according to claim 1, further comprising:
a posture changing device which changes a posture of the blade; and
a posture control unit which controls the posture changing device such that the blade scrapes the ground to the height of the surface to be constructed based on the height position of the cutting edge of the blade with respect to the surface to be constructed calculated by the calculation unit.

4. The work machine according to claim 1, wherein the upper slewing body includes a work device capable of rotating in the vertical direction,
the work machine further including a third posture detection device which detects a posture of the work device,
wherein
the laser beam receiver is mounted on the work device, and
the calculation unit calculates the height position of the cutting edge of the blade with respect to the surface to be constructed based on a laser beam receiving position where the laser beam is received by the laser beam receiver, a posture of the upper slewing body with respect to the lower travelling body, a posture of the work device, and a posture of the blade.

5. The work machine according to claim 4, wherein the work device includes:

a boom mounted on the upper slewing body in a rotatable manner in the vertical direction; and an arm mounted on the boom in a rotatable manner in the vertical direction, and the laser beam receiver is mounted on the arm so as to extend in a longitudinal direction of the arm.

6. The work machine according to claim 1, wherein the first notification control unit causes the first notification device to perform the notification of prohibiting turning of the upper slewing body after the operation is started in a start state where the upper slewing body further turns by a predetermined angle from the initial state.

7. The work machine according to claim 1, further comprising:

a warning device capable of issuing a warning; and a warning control unit which causes the warning device to issue a warning when the upper slewing body is turned after the operation is started.

8. The work machine according to claim 1, wherein the first posture detection device is a relative angle detection device which detects a relative angle of the upper slewing body with respect to the lower travelling body, and the calculation unit calculates the height position of the cutting edge of the blade with respect to the surface to be constructed based on the relative angle detected by the relative angle detection device in a case where the upper slewing body turns after the operation is started in the initial state where the angle of the upper slewing body with respect to the lower travelling body is the specific angle, and the direction of the upper slewing body with respect to the inclination direction of the laser beam is the specific direction.

9. The work machine according to claim 1, wherein the initial state is a state where the upper slewing body faces a front surface with respect to a front surface of the lower travelling body, and the direction of the upper slewing body is parallel to the inclination direction of the laser beam.

10. The work machine according to claim 1, further comprising:

an azimuth sensor which detects at least one of an azimuth of a front surface of the lower travelling body and an azimuth of a front surface of the upper slewing body; and a determination unit which determines whether or not the work machine is in the initial state based on the inclination direction of the laser beam, the azimuth of the front surface of the lower travelling body, and the azimuth of the front surface of the upper slewing body.

\* \* \* \* \*